United States Patent
Fontana et al.

(10) Patent No.: US 11,748,459 B2
(45) Date of Patent: Sep. 5, 2023

(54) REDUCING SOFTWARE RELEASE DATE TAMPERING BY INCORPORATING SOFTWARE RELEASE DATE INFORMATION INTO A KEY EXCHANGE PROTOCOL

(71) Applicant: PACE Anti-Piracy, Inc., San Jose, CA (US)

(72) Inventors: Joseph Fontana, San Jose, CA (US); Paul Allen Cronce, San Jose, CA (US)

(73) Assignee: PACE Anti-Piracy, Inc., San Jose, CA (US)

( * ) Notice: Subject to any disclaimer, the term of this patent is extended or adjusted under 35 U.S.C. 154(b) by 114 days.

(21) Appl. No.: 16/903,230

(22) Filed: Jun. 16, 2020

(65) Prior Publication Data
US 2020/0311228 A1    Oct. 1, 2020

Related U.S. Application Data

(63) Continuation-in-part of application No. 15/668,567, filed on Aug. 3, 2017, now abandoned.

(51) Int. Cl.
*G06F 21/12* (2013.01)
*H04L 9/08* (2006.01)

(52) U.S. Cl.
CPC ......... *G06F 21/125* (2013.01); *H04L 9/0822* (2013.01); *H04L 9/0877* (2013.01); *H04L 9/0891* (2013.01); *H04L 9/0897* (2013.01); *G06F 2221/0753* (2013.01); *G06F 2221/0755* (2013.01); *H04L 2209/16* (2013.01)

(58) Field of Classification Search
None
See application file for complete search history.

(56) References Cited

U.S. PATENT DOCUMENTS

| 6,683,954 | B1 | 1/2004 | Searle | |
| 6,871,192 | B2 * | 3/2005 | Fontana | G06F 21/121 |
| | | | | 705/51 |
| 7,124,445 | B2 * | 10/2006 | Cronce | G06F 21/14 |
| | | | | 717/136 |
| 7,934,104 | B2 | 4/2011 | Jones | |

(Continued)

FOREIGN PATENT DOCUMENTS

| AU | 2008200148 A1 * | 2/2008 | G06F 8/20 |
| WO | WO-2005003935 A1 * | 1/2005 | G06F 21/121 |

OTHER PUBLICATIONS

Whitmore, J. et al., "Threat analysis in the software development lifecycle", IBM J. RES & DEV. vol. 58 No. 1 Paper 6, Jan./Feb. 2014. (Year: 2014).*

*Primary Examiner* — Neha Patel
*Assistant Examiner* — Clay C Lee
(74) *Attorney, Agent, or Firm* — Schwabe, Williamson & Wyatt, PC (57) ABSTRACT

Exemplary embodiments prevent tampering of a software release date associated with a software application by incorporating the software release date into a key exchange with a security domain. If the software release date is tampered with, then the key exchange results in the wrong key exchange key. Without the correct key exchange key, the software application will fail its check of the license, and the software application will no longer continue to run.

23 Claims, 6 Drawing Sheets

(56) References Cited

U.S. PATENT DOCUMENTS

| | | | |
|---|---|---|---|
| 2003/0120605 A1* | 6/2003 | Fontana | G06F 21/10 |
| | | | 705/59 |
| 2005/0044359 A1* | 2/2005 | Eriksson | G06F 21/125 |
| | | | 713/165 |
| 2005/0289072 A1 | 12/2005 | Sabharwal | |
| 2007/0265973 A1* | 11/2007 | Kahn | G06F 21/10 |
| | | | 705/57 |
| 2012/0174090 A1* | 7/2012 | Carollo | G06F 8/65 |
| | | | 717/173 |
| 2012/0185695 A1 | 7/2012 | Shah | |
| 2019/0044709 A1 | 2/2019 | Fontana | |

* cited by examiner

API Call
600 setReleaseLimitlicenseParameters (string sessionId,
string licenseId,
ReleaselimitLicenseParameters releaselimitlicenseParameters)

Parameters

| Name | Description |
|---|---|
| sessionId | Every method call requires a session ID obtained through the authentication process |
| licenseId | Identifies the license to be modified |
| releaselimitLicenseParams | Defines a pair of release date limit values to use for the license |

FIG. 6

REDUCING SOFTWARE RELEASE DATE TAMPERING BY INCORPORATING SOFTWARE RELEASE DATE INFORMATION INTO A KEY EXCHANGE PROTOCOL

CROSS-REFERENCE TO RELATED APPLICATIONS

This application is a continuation-in-part of U.S. application Ser. No. 15/668,567, filed Aug. 3, 2017, the entire disclosure of which is incorporated herein by reference.

BACKGROUND

The problem of software piracy is well known in the computer industry. This problem results in substantial losses for software developers. Many methods have been used to try to prevent unauthorized use of over the years, with limited success. Typically, the effort put out to break protection schemes is proportional to the value of the protected software. Thus, if a software program has high demand, such as a computer game, or has a high cost per unit, such as a professional tool sold to a small market, it is likely to be attacked by software hackers for the purpose of creating an unprotected version of the product. This unprotected version is then made available to others at low cost or free via the internet or other means.

One software-licensing scheme is a time-limited license, where the software publisher grants the user a license that allows the user to run the software for limited time, such as a year. Once the year is over, the user needs to buy a new time-limited license to keep running the software. This is a subscription model, which allows the software publisher to make reoccurring revenue when the user renews the license. This revenue can be allocated towards creating new versions of the software. In this case, all versions of the software typically work with all of the licenses. The problem with this model is that the user is frustrated after the time limit is up, because the user cannot run any version of the software without paying an additional fee.

A second model requires a new license (not typically time-limited) for each version of the software. The software publisher makes revenue when they sell new licenses for the new version of the software. The problem with this is that if a user buys just before a software release, the user is frustrated because the user has a license for the older version. However, the user does have a perpetual license for that older version of the software. So user's find this less frustrating that the first model.

A third model, which is a paid maintenance, allows users to buy a year's worth (or some other time period worth) of software updates. The user gets to run perpetually the current version and any version of the software that is released in the next year. At the end of the year, the user can opt to extend maintenance by paying for another year of updates, and so on. This model solves the user frustration mentioned in the description of the two previous models, while allowing the software publisher to get reoccurring revenue from software updates.

The difficulty with this third model is licensing. Keeping track of and issuing new or updated licenses for every software release can be difficult, but there are other ways of licensing that fits this third model. One way in which this licensing is implemented is by incorporating software release date information into the software itself. During runtime, an authorization tool in the software determines whether the software release date is within the user's software release date range. If the software release date does not fall within this range, then the software will not function.

The problem with licensing this way is that hackers can easily tamper with the software release date of a version of software. Even if the software release date is encrypted, the encrypted software release date of one version of the software could be hacked into another copy of the software.

Accordingly, what is needed to prevent hackers from tampering with the software release date in order to prevent hackers from unlocking versions of the software that are not supposed to run.

BRIEF SUMMARY

The exemplary embodiment provides methods and systems for reducing tampering with the software release date. Aspects of the exemplary embodiment may include during a software application protection phase, using a license key assigned to the software application and the software release date of the software application to generate a first encryption key and a second encryption key; using the first encryption key to encrypt the software application to create a protected software application, and bundling the second encryption key with the protected software application; storing license information associated with the software application, including the license key, in a security domain to protect the licensing key from discovery; when the protected software application is invoked on the computer, passing a license ID and the software release date from the protected software application to the security domain; responsive to the security domain containing the license information identified by the license ID, determining whether the software release date is within a release date range associated with the license information, and if so, using the license key stored in the security domain and the software release date to generate the first encryption key and the second encryption key; encrypting first encryption key with the second encryption key to create a protected first encryption key, and passing the protected first encryption key to the computer; and using the second encryption key bundled with the protected software application to decrypt the protected first encryption key resulting in a decrypted first encryption key, and using the first encryption key to decrypt the protected software application for execution.

According to the method and system disclosed herein, the exemplary embodiment prevents tampering with the software release date as doing so will negatively affect the key exchange with the security domain and the software application will be unable to run.

DETAILED DESCRIPTION

The exemplary embodiment relates to reducing tampering of the software release date by incorporating software release date information into a key exchange protocol. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

A software license typically comprises a license period, which includes a license start and a license end date, for which the license is valid. Under the software license, a user or customer can run the protected software covered by the software license only within that license period.

The term "software release date" refers to the date a software publisher releases an original, upgraded or new version of a software application to the customer. The software release date may be expressed as a single date. The term "software release date range" refers to a time period that encompasses software releases. The software release date range may be expressed as, a single date along with a length of time, a start date only, an end date only, or both a start date and an end date. In this type of licensing, the software license may allow the end-user to run any version of the software as long as the software release date of that version of software is within the software release date range of the license. For example, the end-user may be permitted to run any released version of the software that has a release date within a paid maintenance period.

As stated above, the software release date is often embedded in a software application so that during runtime, an authorization tool in the software can determine if that version of the software is authorized by determining whether the software release date is within the customer's software release date range. The problem with embedding the software release date into a software application is that hackers can change this information. Even if the software release date is encrypted, the encrypted software release date from one release or version of a software application can be substituted with the encrypted software release date of another release of the software application, therefore illegally extending use of the software.

In a first aspect, the disclosed embodiments reduce or prevent tampering of the software release date associated with a version of software in order to prevent unauthorized versions from being unlocked. This is accomplished by incorporating the software release date into a key exchange with a security domain. If the software release date is tampered with, then the key exchange results in the wrong key exchange key. Without the correct key exchange key, the software application will fail its check of the license, and the software application will no longer continue to run.

In a second aspect, the disclosed embodiments provide a mechanism for the software publisher 13 to implement a release date license (RDL) that allows the publisher to decide arbitrarily which future software versions a user can use based on the software release date.

Figure 1:
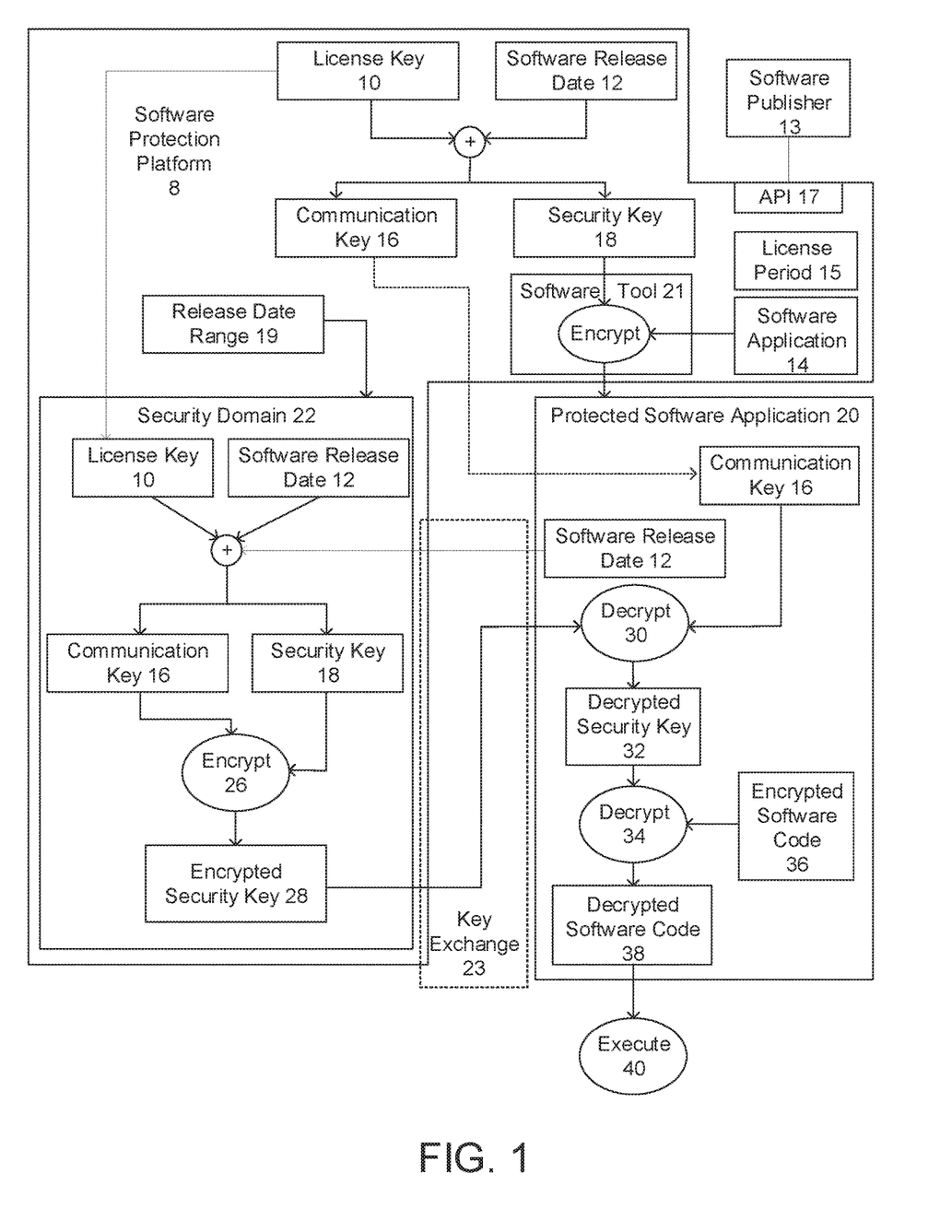
FIG. 1 is a block diagram graphically illustrating a process for incorporating a software release date into a key exchange protocol to prevent software tampering.

FIG. 1 is a block diagram graphically illustrating a process for incorporating a software release date into a key exchange protocol to prevent software tampering. In one embodiment, a software application 14 is protected from tampering by a software protection platform 8. In one embodiment, the software protection platform 8 provides the software security licensing management services to organizations, such as a software publisher 13, through the development life cycle of the software application 14. In one embodiment, the software protection platform 8 may support several different software license types to cover varying business needs. These may include perpetual, network-based, subscription, trial, timed, and release date licenses. These license types may also be combined. For example, a license that is timed with a license period 15 to limit how long a license may be used may be combined with a software release date range 19 to limit which versions of software may be used.

The software protection platform 8 protects the software application 14 from tampering through the use of encryption keys generated from a license key 10 associated with a license for the software application 14. One of the encryption keys is used to encrypt the software application 14 resulting in the protected software application 20. One of the encryption keys is then bundled with the protected software application 20, and another one of the encryption keys is stored in a security domain 22. During runtime of the protected software application 20, a cryptographic check performs a key exchange 23 between the protected software application 20 and the security domain 22 so that hackers cannot easily influence the key exchange itself. If the key exchange 23 results in the correct key exchange key, then a cryptographic check of the license will allow the software application to continue to run.

According to the exemplary embodiments, the software release date 12 is prevented from being tampered with by incorporating the software release date 12 into the key exchange 23 by modifying the cryptographic keys with the software release date 12.

In further detail, and according one aspect of the exemplary embodiment, a license key 10 and the software release date 12 are used key to create first and second keys, which are referred to herein as a communication key 16 and a security key 18. The security key 18 is used by a security software tool 21 to encrypt the software application 14 prior to sale to create a protected software application 20. The license key 10 is then stored in the security domain 22 to keep the license key 10 hidden from discovery. The communication key 16 is bundled with the protected software application 20, and is used to implement the key exchange 23 between the protected software application 20 and the security domain 22. The security key 18 is not bundled with the protected software application 20, but is instead generated within the secure environment of the security domain 22 and passed to the protected software application 20 during the key exchange 23 to unlock the software.

When the protected software is invoked on the computer, the protected software application 20 passes the software release date 12 information to the security domain 22. In one embodiment, the software release date range 19 associated with software release date 12 is also passed to the security domain 22 from the software protection platform 8. Once the software release date 12 is verified to be within the software release date range 19, as described below, the security domain 22 uses the license key 10 and the software release date 12 to generate the communication key 16 and the security key 18 within the security domain 22. The security domain 22 then encrypts 26 the security key 18 with the communication key 16 and transfers the resulting encrypted security key 28 to the computer. The communication key 16 bundled with the protected software application 20 is used to decrypt 30 the encrypted security key 28. The resulting decrypted security key 32 is then used to decrypt 34 the encrypted software code 36. The resulting decrypted software code 38 may then be executed 40.

According to the present invention, the protected software application 20 only contains part of the information needed for decrypting the protected software application (e.g., the software release date 12 and the communication key 16), and must receive the remaining information (e.g., the encrypted security key 28) from the security domain 22 before the software can be used. Similarly, the security domain 22 cannot generate the security key 18 without receiving the correct software release date 12 information from the protected software application 20. In addition, since the software release date 12 is used to generate the communication key 16 and the security key 18, any attempt to substitute or modify the software release date 12 or modify the two keys, will cause a failed key exchange 23 and the software will not run.

For additional security, the security domain 22 scrambles or encrypts the security key 18 prior to transferring it to the protected software application 20, thus providing a secure key exchange transaction between the security domain 22 and the protected software application 20. In a further aspect of exemplary embodiment, the protected software application 20 may be required to contain additional information to descramble the encrypted security key 28 before the security key can be used to decrypt the encrypted software code 36. The additional information may be temporary, and may be forgotten once the protected software application is enabled. Thus, for each invocation of the protected software, the appropriate secure transaction must take place successfully.

In a second aspect of the disclosed embodiments, a mechanism is provided for the software publisher 13 to implement a release date license (RDL) that allows the publisher to decide arbitrarily which future software versions a user can use based on the software release date. For example, assume that a user has a license under a subscription model and pays monthly. In this case, once the user stops paying the monthly subscription fee, the user can continue to use the current version of the software, but is unable to run new versions of the software. Assume that six months later, the user wishes to license the newest version of the software from the publisher. Under conventional licensing schemes, the user would pay a license fee for the newest version of software and the publisher would need to issue a new license to user.

According to the second aspect of the disclosed embodiments, the software protection platform 8 that protects the software application 14 provides the software publisher 13 with an application programming interface (API) 17. The API 17 allows the software protection platform 8 to receive an API notification from the software publisher 13 that the license period 15 of a user's existing or expired license needs to be replaced with the software release date and software release date range based on a commercial agreement (e.g., a maintenance plan) between the publisher 13 and the customer. The software protection platform 8 then stores the software release date into the protected software application 20 and stores the software release date range in the security domain 22 to enable the security domain 22 to validate use of the protected software application once invoked. Under this scheme, the publisher 13 can easily authorize use of new versions of the software application 14 to the user by simply replacing the original license period 15 of an existing or expired license with a new software release date and software release date range, rather than having to issue a new license.

Figure 2:
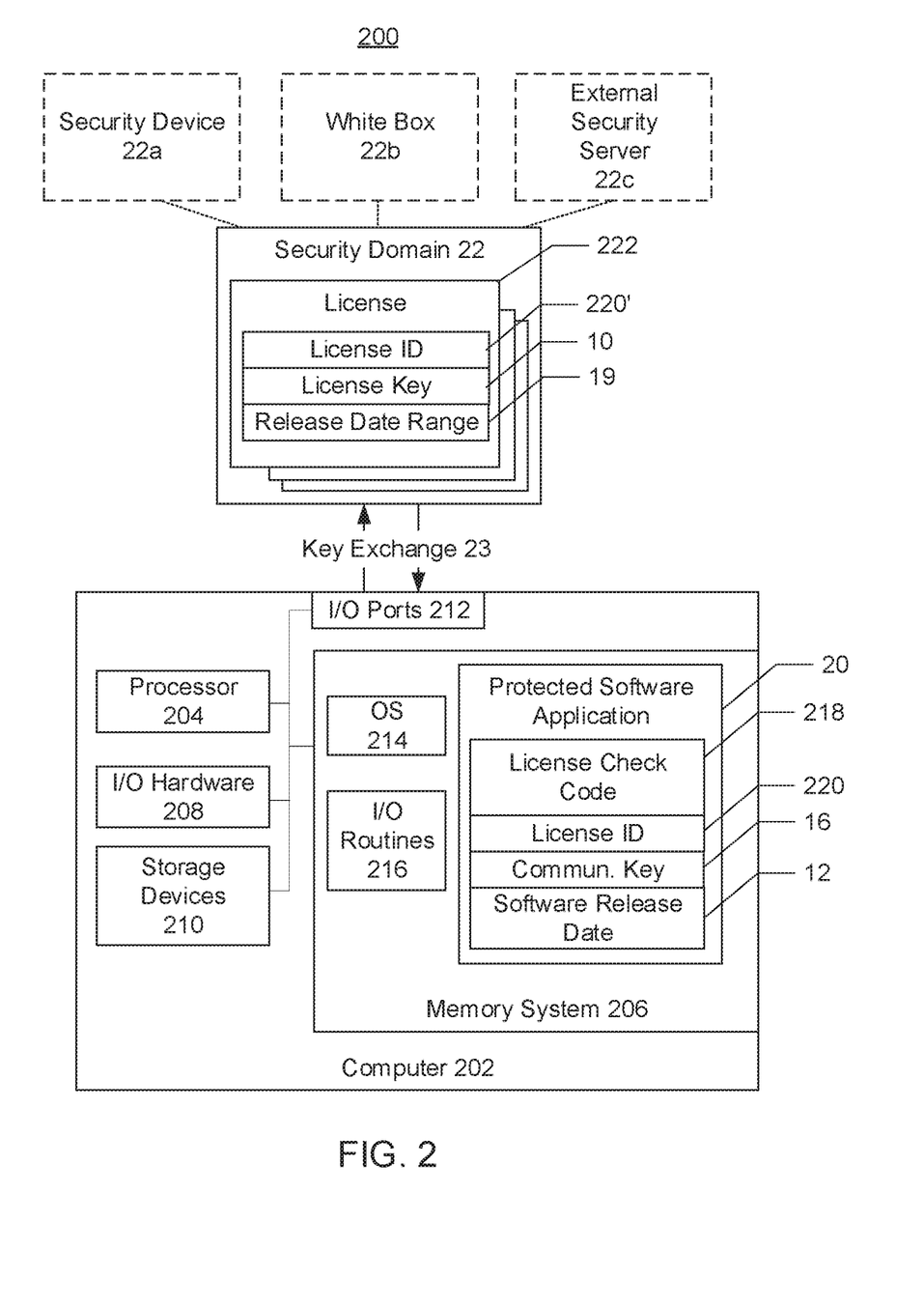
FIG. 2 is a diagram illustrating one embodiment of a system for reducing software release date tampering by incorporating a software release date into a key exchange protocol, where like components from FIG. 1 have like reference numerals.

FIG. 2 is a diagram illustrating one embodiment of a system for reducing software release date tampering by incorporating a software release date into a key exchange protocol, where like components from FIG. 1 have like reference numerals. In one embodiment, the system 200 comprises a computer 202 to execute the protected software application 20, which is in communication with at least one security domain 22 to implement the key exchange 23 and authorize use of the protected software application 20. The computer 202 includes at least one processor 204, a memory system 206, and input/output (I/O) hardware 208 coupled together via a system bus. The computer 202 may exist in various forms, including a server, a personal computer (PC) (e.g., desktop, notebook, tablet), a workstation, a mobile phone, a set-top box, a game system, an Internet of things (IOT) device, a wearable device, and the like. The I/O hardware 208 may include input devices (not shown) such as a keyboard and a mouse, and output devices, such as a display device. The computer 202 may further include computer-readable media, including the memory system 206 and read/write nonvolatile storage devices 210, such as flash memory, hard drive, optical disk drive, magnetic disk drive, and the like, containing data and computer instructions that implement the embodiments described herein. The computer 202 may also include I/O ports 212, such as a serial port, a USB port, an IR port, and/or a wireless port, to connect various external devices, and in some embodiments, to enable communication between software executing on the computer 202 and the security domain 22.

The memory system 206 of computer 202 may include an operating system 214, I/O routines 216, and a protected software application 20. The I/O routines 216 are required for communicating over the I/O ports 212. The I/O routines 216 may be part of the operating system 214, or may be loaded as part of the protected software application 20 in some cases. The protected software application 20 is protected through encryption to thwart unauthorized use according to the exemplary embodiments, and may be loaded and installed over a network from a software publisher or online store, for example, or loaded from storage devices 210.

The protected software application 20 is executed by processor 204 of the computer 202 at runtime and is first authorized for use according to the exemplary embodiments described below. According to one embodiment, the protected software application 24 may be bundled with license check code 218, a license ID 220, the communication key 16, the software release date 12.

The license check code 218 performs cryptographic checks of the license 222 during runtime on a computer. In one embodiment, the license check code 218 may be injected in once in the protected software application 20. In another embodiment, the license check code 218 may be injected in many places throughout the protected software application 20 so that the cryptographic checks of the license cannot be easily removed. The license check code 218 establishes communications with the security domain 22 and uses the license ID 220, the communication key 16 and the software release date 12 and implements the key exchange 23 with the security domain 22.

The license ID 220, the software release date 12, and the software release date range 19 may be associated with a license 222 for the protected software application 20. The license ID 220 may be any type of identifier used to identify the license 222. The software release date 12 may represent a single date that the version of the software application was publically released. The release date range 19 may include a start date and an end date to define the time period. In another embodiment, the software release date range 19 may include a start or end date and a length of time the license is valid e.g., 1 yr. or 24 mo., and the like) to define the time period.

In one embodiment, the security domain 22 communicates with the computer 202 on which the protected software application 20 is installed to aid in protecting the protected software application 20 from tampering and to provide secure execution. In one embodiment, the security domain 22 may store or access information regarding the license 222 associated with the protected software application 20, including the license ID 220', the license key 10, and the software release date range 19. According to one embodiment, after each new version of the software application is released to the customer, the software release date range 19 is replaced with a new one. In one embodiment, the license key 10 may also function as a product key for the protected software application 20. Each software product from a publisher would typically have different license keys because the license key would be different for each software product. Each version of a software product would also have different license keys because the software release date 12 is different for each version. However, in another embodiment, different versions of the software may have a same license key 10.

In one embodiment, the security domain 22 may be implemented as a portable external security device 22a that plugs into the computer 202 on which the protected software application 20 is to be run; a white box 22b in the memory system 206; or an external security server 22c.

The security device 22a embodiment may be implemented as a dongle, which is a small form-factor hardware device that connects to the computer 202 via USB, and may include components (not shown) such as a processor, a memory, input/output circuitry, and I/O port. Typically, the processor may comprise a security processor containing necessary circuitry to enable data to be stored in the memory in encrypted form and thus not usable except by the processor itself. The memory is used to store security information, such as encryption keys and authentication information. Other facilities of the processor enable it to establish a secure communications path with the processor 204 on the host computer 202. This technology is well known to those with ordinary skill in the art, and thus will not be described in detail herein. Alternate embodiments include the replacement of the processor with custom logic to perform the same function in hardware rather than software.

The white box 22b may refer to white-box cryptography, which implements a cryptographic algorithm in software that keeps cryptographic assets (e.g., a secret key) secure even when subject to attacks. Typically, the security relies on the confidentiality of the secret key and random data. In one embodiment, the white box 22b may run in the memory system 206 of the computer 202, or even a coprocessor (not shown) for additional security.

The security server 22c may refer to a Web server that guarantees secure transactions and may use the Secure Sockets Layer (SSL) protocol for data encryption and decryption to protect data from unauthorized interception.

The license check code 218 may communicate with the security domain 22 either with internal routines or via standard I/O routines 216 provided with the operating system 214. If the security domain 22 is implemented as the external security device 22a or the external security server 22c, then communication with the license check code 218 may occur through the I/O ports 212. If the security domain 22 is implemented as the white box 22b, then communication with the license check code 218 may occur through software calls.

Figure 3:
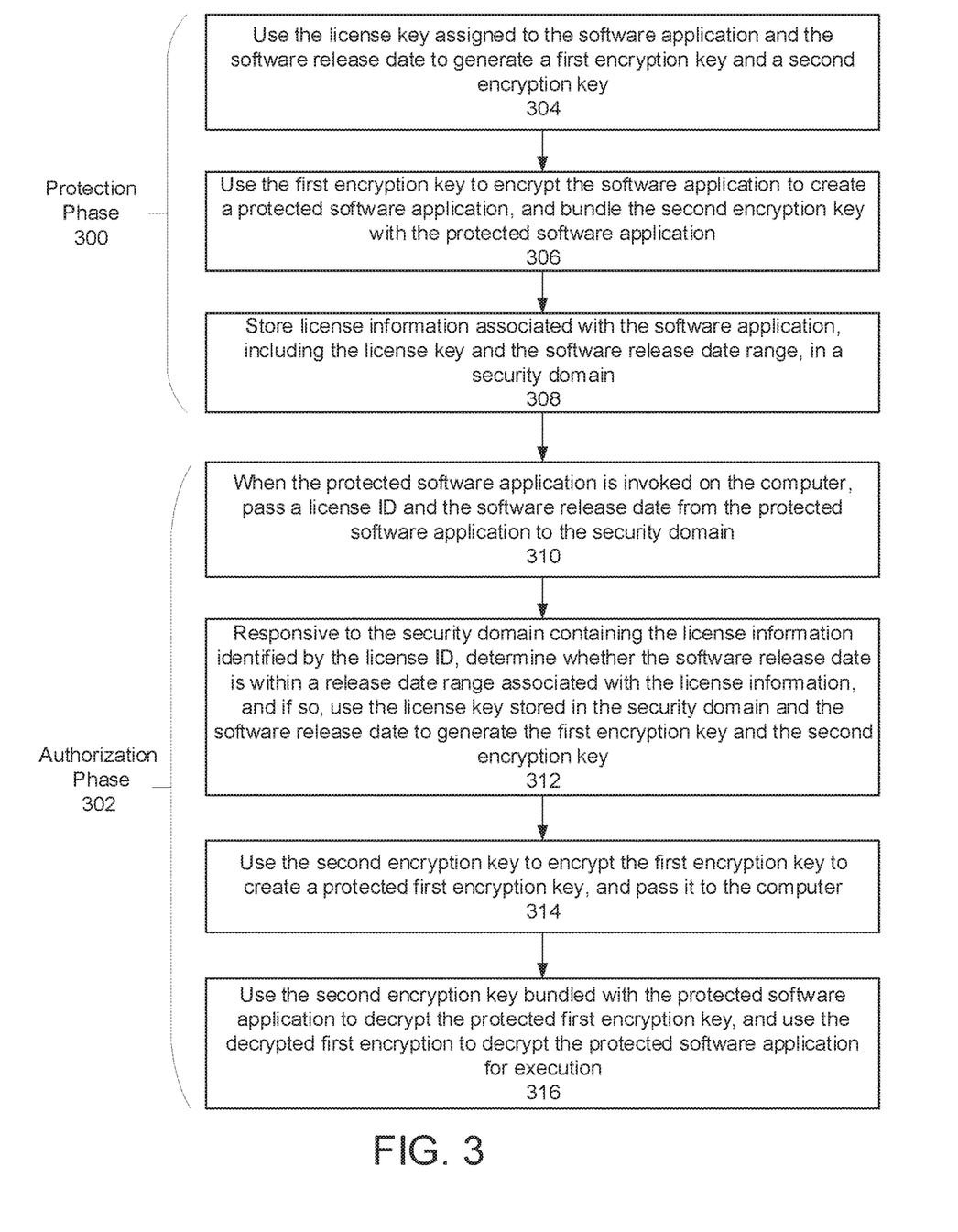
FIG. 3 is a flow diagram illustrating one embodiment of a process for reducing software release date tampering.

FIG. 3 is a flow diagram illustrating one embodiment of a process for reducing software release date tampering. The process includes a software application protection phase 300 where the software application 14 is protected prior to distribution and sale, and an authorization phase 302 where the protected software application 20 has been installed on the computer 202 is invoked for use.

During the software application protection phase 300, the license key 10 assigned to the software application 14 and the software release date 12 of the software application 14 are used to generate a first encryption key and a second encryption key (block 304). In one embodiment, information about the license 222, including the license key 10, the software release date 12, the software release date range 19, and the software application 14 may be received by the software protection platform 8 from the software publisher 13, preferably through API 17.

In one embodiment, the first encryption key may comprise the security key 18 and the second encryption key may comprise of the communication key 16. In one embodiment, the license key 10 may comprise values from various sources and may be at least 16 or 32 bytes in length (256 bits). In one embodiment, the security key 18 and the communication key 16 may be in the form of a number at least 16 bytes in length. This is 128 bit encryption, and is considered sufficiently difficult to break. In the future, both the license key 10 and the security key 18 and the communication key 16 may need to be larger, as computational power available for breaking encryption increases.

The first encryption key is used to encrypt the software application 14 to create a protected software application, and the second encryption key is bundled with the protected software application (block 306). This process creates the protected software application 20. The information about license 222 associated with the software application 14, including the license key 16, is stored in the security domain 22 to protect the license key 10 from discovery (block 308).

When the protected software application is invoked on the computer, the license ID 220 and the software release date 12 from the software application are passed to the security domain (block 310).

Responsive to the security domain 22 containing the license 222 identified by the license ID 220, it is determined whether the software release date 12 is within the software release date range 19 associated with the license information, and if so, the license key 10 stored in the security domain 22 and the software release date 12 are used to generate the first encryption key and the second encryption key, preferably within the security domain 22 (block 312).

The second encryption key is used to encrypt the first encryption key to create a protected first encryption key, which is then passed from the security domain 22 to the computer 202 (block 314).

The second encryption key bundled with the protected software application 20 is used to decrypt the protected first encryption key resulting in a decrypted first encryption key, and the decrypted first encryption is used to decrypt the protected software application 20 for execution (block 316).

Figure 4:
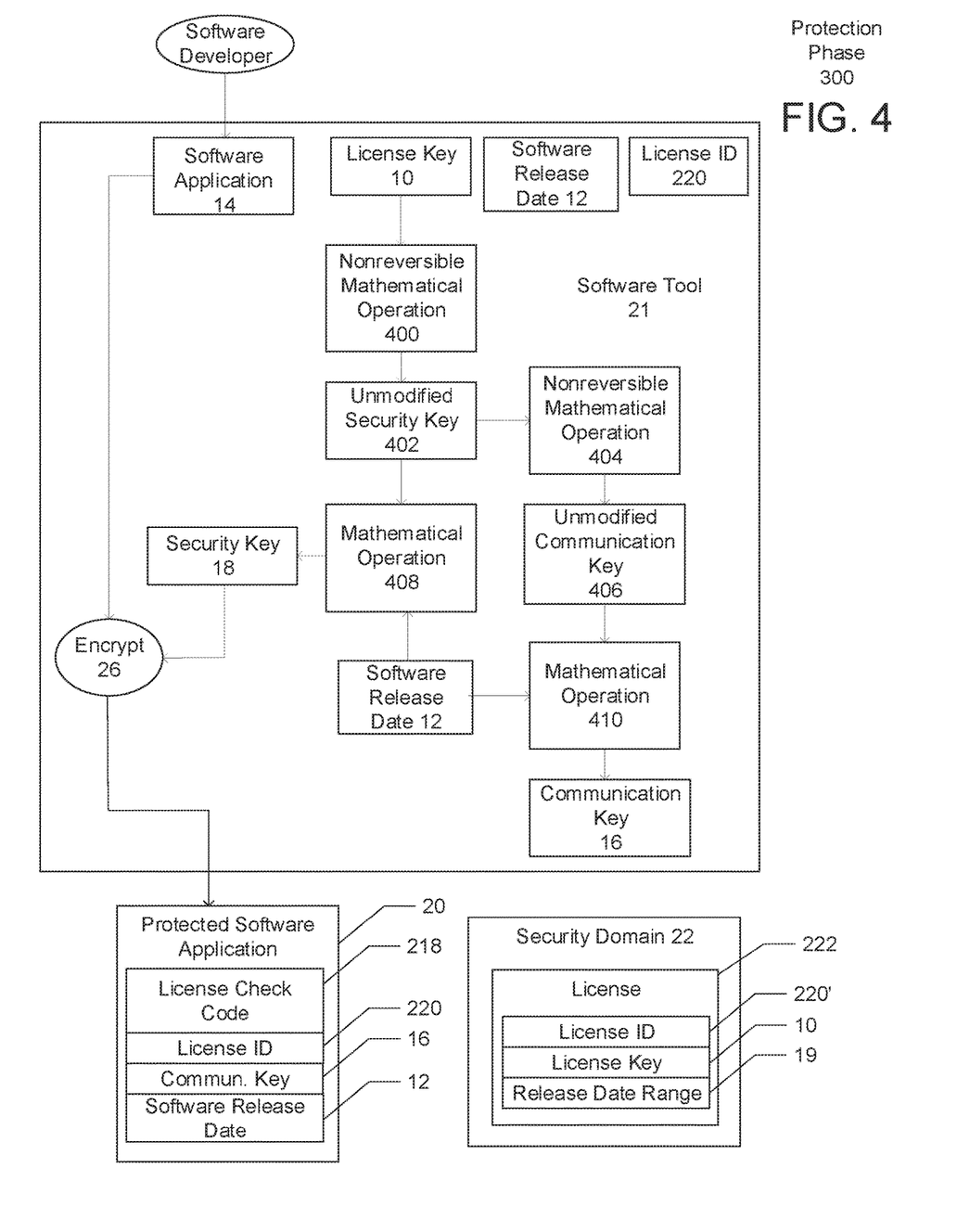
FIG. 4 is a block diagram illustrating further details of a key generation process performed during the protection phase by the security software tool.

FIG. 4 is a block diagram illustrating further details of a key generation process performed during the protection phase by the security software tool 21. The process may begin by receiving the software application 14 to be protected from the software developer, and receiving associated license information including the license key 10, the software release date 12 and the license ID 220 from the software developer or another source. The license key 10 is the underlying primary key assigned to the particular software application 14 to be protected, and typically does not change between copies of the same software application 14. In one embodiment, the license key 10 may be assigned by a key authority.

The license key 10 is first used to generate an unmodified security key 402 and an unmodified communication key 406 for each portion of the software application 14 to be protected. The unmodified security key 402 may be calculated by performing a first nonreversible mathematical operation 400 on the license key 10. Once the unmodified security key 402 is derived, the unmodified communications key 406 may be calculated by performing a second nonreversible mathematical operation 404 on the unmodified security key 402.

According to the exemplary embodiment, the unmodified security key 402 is modified by the software release date 12 through a mathematical operation 408 to generate the actual security key 18. Similarly, the unmodified communication key 406 is modified by the software release date 12 to generate the actual communication key 16. The process just described will also be used within the security domain 22 to generate the security key 18 and the communication key 16 the during software authorization.

By generating the security key 18 and the communication key 16 from a non-reversible operation, it is difficult or impossible to determine the hidden license key 10. In the preferred embodiment, the nonreversible mathematical operation 404 may have a higher level of security than the non-reversible mathematical operation 400, and therefore uses a more complex algorithm. This is because it is easiest to discover the communications key 16, since it is embedded within the protected software application 20. The security key 18 does not appear outside of the security device 22 except in a randomized, encrypted format, and temporarily in an unencrypted format during the decryption of the protected software 20. It is immediately discarded after use. Thus, the security key 18 is much more difficult to determine electronically. By making it impossible to compute the security key 18 from the communications key 16, this protective wall is maintained, and the protected software 20 remains protected.

The non-reversible mathematical operations 400 and 404 can be fairly simple to very complex. In the embodiment, where the security domain 22 is implemented as a security device 22a, a fairly limited processor may be available so a simpler algorithm may be preferred. In one embodiment, the non-reversible mathematical operations 400 and 404 could be a MD5 message digest algorithm. As semiconductor technology improves, and more memory and processing power becomes available in low-cost and low-power security processors, the algorithms can be more and more complex. Of course as algorithms become more complex, they also become more secure. Thus, the most complex algorithm practical within the limitations of the available technology is selected for a given implementation.

Referring still to FIG. 4, once the communication key 16 and security key 18 are generated, the software tool 21 embeds the license ID 220 and the software release date 12 in the software application 14. The software tool 21 may then encrypt the software application 14 with the security key 18 to create the protected software application 20. At this time, the communication key 16 may be embedded in the protected software application 20, and the license check code 218 is also added in order to perform the key exchange 23 with the security domain 22. In one embodiment, the license check code 218 is added in various locations in the protected software application 20 so that it will be very difficult for hackers to find all the protected portions. Once the software application has been protected, the license information 222, including the license ID 220', the license key 10 and the software release date range 19, are stored in the security domain. In another embodiment, the protected software application 20, the communication key 16, a license check code 218, the license ID 220 and the software release date range 224 may be simply combined together to form a software package, depending on the hardware configuration of the intended computer.

In order to adequately maintain secrecy, it is important that the communications key 16 be embedded into the protected software application 20 in an obscure manner. One embodiment includes reading hardware values from registers inaccessible from the computer's system bus as part of the data to compute the communications key 16. There are many additional methods for obscuring the communications key 16, which are known to one of ordinary skill in the art, and thus will not be described herein.

After the protection phase, the protected software application 20 is ready for distribution and sale. In the embodiment where the security domain 22 is implemented as the security device 22a or the external security server 22c, the security domain 22 may be made available for sale, either as part of the software, or as a separate purchase. In one embodiment, the security domain 22 may contain multiple licenses 222 for multiple software applications.

Figure 5:
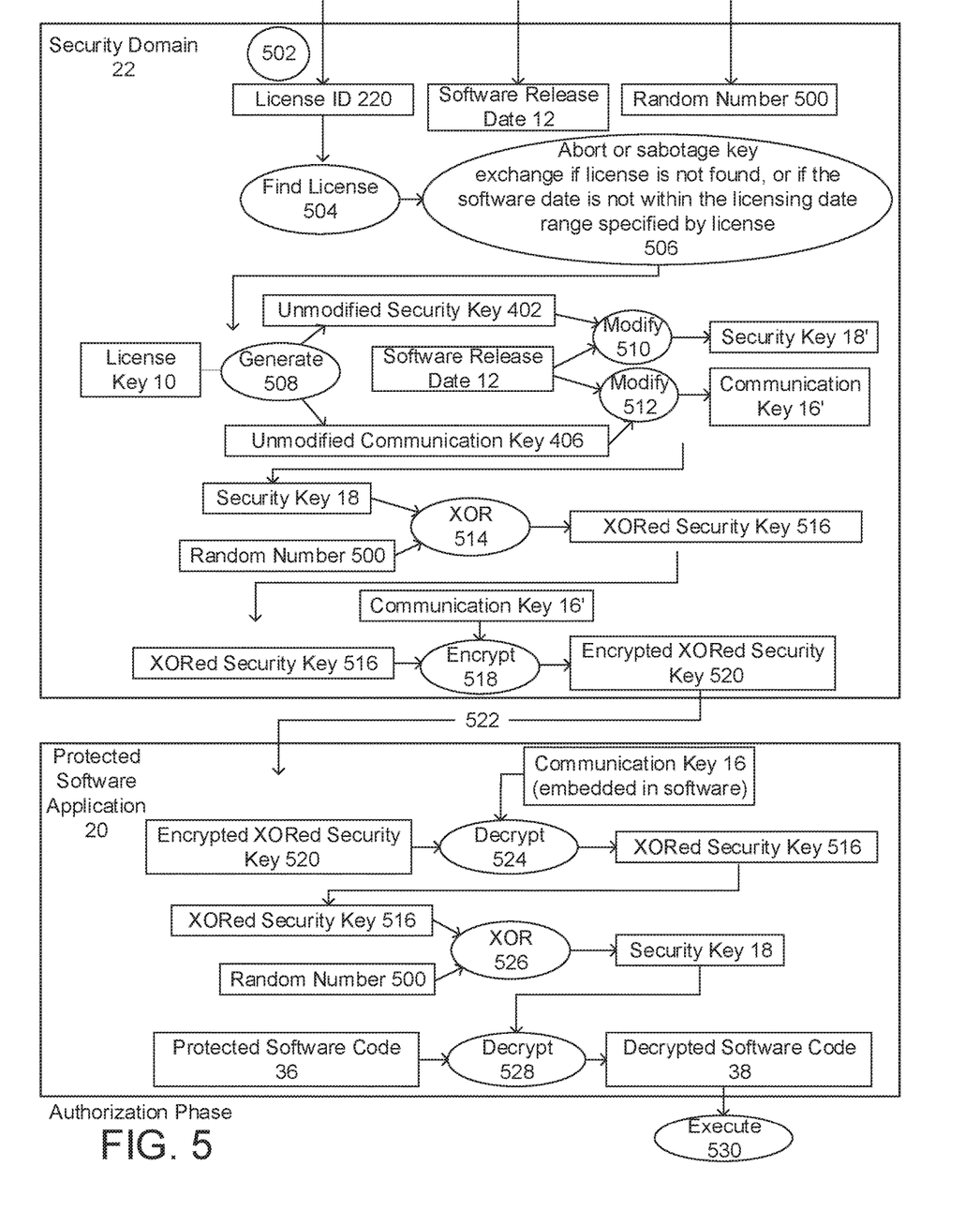
FIG. 5 is a block graphically illustrating the authorization phase in further detail according to a further embodiment.

FIG. 5 is a block graphically illustrating the authorization phase in further detail according to a further embodiment. When the protected software application 20 is invoked on the computer 202, the security domain 22 receives from the computer 202 the license ID 220, the software release date 12, and in addition, a random number 500 (step 502). The security domain 22 uses the license ID 220 to find a license within security domain 22 matching the license ID 220 (step 504). The security domain 22 aborts or sabotages the key exchange 23 if the corresponding license is not found, or if the license 222 is found, if the software release date 12 is not within the licensing date range 224 specified by license 222 (step 506).

Similar to the protection phase, the license key 10 is then used to generate the unmodified security key 402 and the unmodified communication key 406 (step 508). The security domain 22 modifies, as in the protection phase, the unmodified security key 402 and/or the unmodified communication key 406 using the software release date 12 to derive copies of the actual security key 18' and actual communication key 16' (steps 510 and 512).

The security domain 22 may alter the security key 18 in an reversible way, such as performing an exclusive-OR operation (XOR) of the security key 18 with the random number 500, to obtain an XORed security key 516 (step 514). The present invention uses the random number 500 to provide another level of security in hiding the security key 18 generated by the security domain 22. The security domain 22 then encrypts the XORed security key 516 with the communication key 16' to create an encrypted XORed security key 520 (block 518). Finally, the security domain 22 sends a response containing the encrypted XORed security key 520 back to license check code 218 (block 522). Because the security key 18 is randomized using the random number 500, the response is different each time, and thus the security domain 22 cannot be replaced by a simple circuit that generates the same response each time.

Once the encrypted XORed security key 520 is received by the license check code 218, the license check code 218 decrypts the encrypted XORed security key 520 using the communication key 16 embedded in the protected software application 20 to obtain the XORed security key 516 (step 524). License check code 218 reverses the effects of the random number by performing an exclusive-OR operation (XOR) of the XORed security key 516 with the random number 500 to obtain a copy of the security key 18 (step 526). The security key 18 is then used to decrypt the protected software code 36 (step 528) to allow the decrypted software code 38 to execute correctly (step 530). In an alternative embodiment, the security key 18 could be used instead in computations critical to running the decrypted software code 38.

According to the exemplary embodiments, the security key 18 is never stored with the protected software application 20. Rather security key 18 is generated dynamically from the security domain response, used (in step 528) and discarded. Thus, the security key 18 is not available for discovery by memory dumps or expansion bus transaction analyzers.

And because the security key 18 is modified by the software release date 12, any attempt by hackers to modify the software release date 12 will result in a failed key exchange, and the software application will not run. Thus, the exemplary embodiments prevent or reduce tampering of the software release date associated with a software license.

Figure 6:
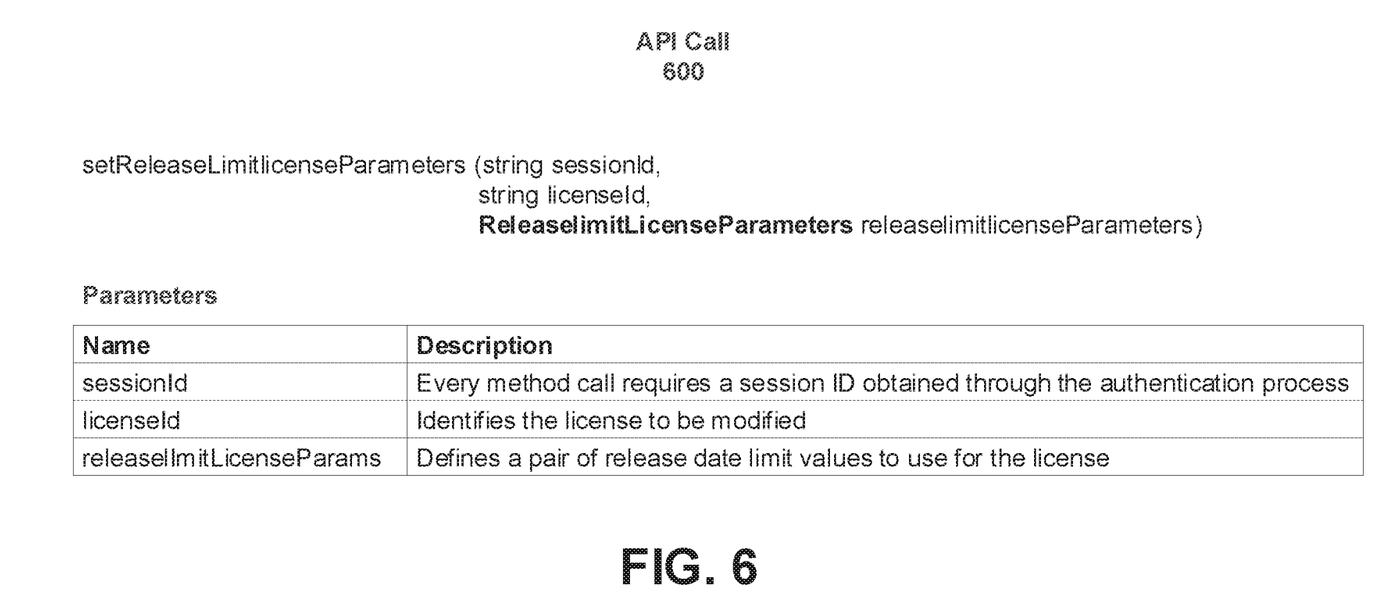
FIG. 6 is a diagram illustrating an example API call.

FIG. 6 is a diagram illustrating an example API call using the API 17 shown in FIG. 1. Typically, the API call would be invoked in response to a commercial transaction between the software publisher 13 and a customer for future use of the software application 14/20. The API call 600 may be invoked by the software publisher 13 to change the release date or range limits to new dates of an existing license. The main intent of the API call 600 may also allow software publisher 13 to change the license type of the existing license.

In one embodiment, the API call 600 can be used to add release date limits to an existing license. In one example embodiment, the API call 600 may be referred to a "setReleaseLimitLicenseParameters( )" call, which is invoked to change the limits on a license, and basically transforming the license into a release limited license.

The setReleaseLimitLicenseParameters call may include at a minimum a sessionID, a licenseID and a ReleaseLimitLicenseParameters argument, which includes release date limits parameters. The sessionId is the session ID or session token or other piece of data used in network communications (often over HTTP) to identify a session or series of message exchanges obtained through the login authentication process. In one embodiment, the licenseID corresponds to the license ID 220 and is an identifier of the license 222 to be modified.

The ReleaseLimitLicenseParameters argument defines date limit values to use for the license using the ReleaselimitlicenseParameters. The releaselimitlicenseParameters allows the publisher to define the new software release date range limits. In one embodiment, the releaselimitlicenseParameters defines a pair of date limit values that match the release date information placed in the publisher's executable version of the protected software application 20 (i.e., the protected binary). The pair of date limit values may be implemented as a release start date field and a release end date field. The release start date defines the earliest dated binary that the license will authorize, while the release end date defines a latest dated binary that the license will authorize.

When depositing a new license or adding limits to an existing license, at least one of the date strings must specify a valid date, and if both limits are specified, then the release start date must not be after the release end date. When modifying the existing limits on the license, if either string is empty, the corresponding limit from the license is removed. If both limits are specified, then the release start date must not be after the release end date. The publisher 13 may remove any current release limits by providing the releasedatelimitParameters with empty date strings. That is, if both strings are empty, both limits are removed from the license. In one embodiment, specifying these limit dates is not equivalent to depositing a time to license that expires on a fixed date.

At runtime of the protected software 20, the security domain 22 may compare the software release date 12 embedded in the protected software application 20 to the values defined in the release start date field and the release end date field at runtime. In another embodiment, these date limits may be enforced by comparing the date limits to the software release date 12 within the protected software application 20 itself.

A method and system for reducing tampering with a software release day has been disclosed by incorporating the software release date into a key exchange protocol. The present invention has been described in accordance with the embodiments shown, and there could be variations to the embodiments, and any variations would be within the spirit and scope of the present invention. For example, the exemplary embodiment can be implemented using hardware, software, a computer readable medium containing program instructions, or a combination thereof. Accordingly, many modifications may be made by one of ordinary skill in the art without departing from the spirit and scope of the appended claims.

We claim:

1. A computer-implemented method for reducing tampering of a software release date associated with a version of a software application, comprising:

using a license key associated with a license for the version of the software application and the software release date of the version of the software application to generate a first encryption key and a second encryption key, wherein the software release date for the version of the software application is a single date indicating when the version of the software application was released by a software publisher to the public, wherein versions of the software application are different from each other, and wherein the versions of the software application have different software release dates;

embedding a license ID and the software release date in the version of the software application;

using the first encryption key to encrypt the version of the software application to create a protected software application, and bundling the second encryption key with the protected software application; and storing, in a security domain, information associated with the version of the software application to protect the license information from discovery, the information including the license ID, the license key, and a date range that refers to a time period that encompasses the software application release, wherein the security domain includes a first computer having a memory and a processor, the memory containing program instructions, which when executed by the processor, the program instructions are configured to reduce tampering of a software release date associated with a software application; and upon invocation of the protected software application on a second computer, implementing an encryption key exchange between the protected software application and the security domain by:

passing the license ID and the software release date from the protected software application to the security domain;

responsive to the security domain containing the license information identified by the license ID, determining whether the software release date passed from the protected software application is within the date range stored in the security domain;

aborting the encryption key exchange if the license information is not found in the security domain or if the software release date passed from the protected software application is not within the date range stored in the security domain;

if the software release date passed from the protected software if the software release date passed from the protected software application is within the date range stored in the security domain, using the license key stored in the security domain and the software release date passed to the security domain to generate the first encryption key and the second encryption key;

encrypting the first encryption key with the second encryption key to create a protected first encryption key, and passing the protected first encryption key to the second computer;

using the second encryption key bundled with the protected software application to decrypt the protected first encryption key resulting in a decrypted first encryption key; and using the first encryption key to decrypt the protected software application for execution, such that attempted modification of the software release date passed to the security domain results in failed decryption of the protected software application.

2. The computer-implemented method of claim 1, further comprising: representing the date range as at least one: i) a start date and an end date when use of the software ends, and ii) a single date and a length of time.

3. The computer-implemented method of claim 1, wherein the security domain comprises a software protection platform, the method further comprising:

receiving, by the software protection platform, the date range from the publisher of the software application through an application programming interface (API) to allow the publisher to replace or add the date range of a license, wherein the date range comprises a start date and an end date or a date and a length of time; and storing, by the software protection platform, the date range in the security domain to enable the security domain to validate use of the protected software application once the security domain receives the software release date from the protected software application.

4. The computer-implemented method of claim 1, wherein the first encryption key comprises a security key and the second encryption key comprises a communication key.

5. The computer-implemented method of claim 4, wherein using the license key to generate the security key and the communication key further comprises:

using the license key to generate an unmodified security key and an unmodified communication key for each portion of the software application to be protected;

modifying the unmodified security key with the software release date through a first mathematical operation to generate the security key; and modifying the unmodified communication key with the software release date through a second mathematical operation to generate the communication key.

6. The computer-implemented method of claim 5, further comprising:

calculating the unmodified security key by performing a first nonreversible mathematical operation on the license key; and calculating the unmodified communication key by performing a second nonreversible mathematical operation on the unmodified security key.

7. The computer-implemented method of claim 5, further comprising:

once the security key and the communication key are generated, encrypting the software application with the security key to create the protected software application;

embedding the communication key within the protected software application and adding license check code to perform the encryption key exchange with the security domain; and storing the license information, including the license ID, the license key and the date range, in the security domain.

8. The computer-implemented method of claim 1, wherein upon invocation of the software application on the second computer, passing a license ID and the software release date from the software application to the security domain, further comprises:

using the license ID, by the security domain, to find a license within the security domain matching the license ID.

9. The computer-implemented method of claim 8, wherein using the license key stored in the security domain and the software release date to generate the first encryption key and the second encryption key, further comprises:
  using the license key to generate an unmodified security key and an unmodified communication key for each portion of the software application to be protected;
  modifying the unmodified security key with the software release date through a first mathematical operation to generate the security key; and
  modifying the unmodified communication key with the software release date through a second mathematical operation to generate the communication key.

10. The computer-implemented method of claim 8, further comprising:
  altering the security key by performing an exclusive-OR operation (XOR) of the security key with a random number received from the software application to obtain an XORed security key;
  encrypting the XORed security key with the communication key to create an encrypted XORed security key; and
  sending a response containing the encrypted XORed security key back to the software application.

11. The computer-implemented method of claim 10, further comprising:
  receiving the encrypted XORed security key by the software application, and decrypting the encrypted XORed security key using the communication key embedded in the software application to obtain the XORed security key;
  reversing effects of the random number by performing an exclusive-OR operation of the XORed security key with the random number to obtain a copy of the security key; and
  using the security key to decrypt protected software code to allow the decrypted software code to execute correctly.

12. A non-transitory computer-readable medium containing program instructions, which when executed by a processor the program instructions are configured for reducing tampering of a software release date associated with a version of a software application, comprising:
  using a license key associated with a license for the version of the software application and the software release date of the version of the software application to generate a first encryption key and a second encryption key, wherein the software release date for the version of the software application is a single date indicating when the version of the software application was released by a software publisher to the public, wherein versions of the software application are different from each other, and wherein the versions of the software application have different software release dates;
  embedding a license ID and the software release date in the version of the software application;
  using the first encryption key to encrypt the version of the software application to create a protected software application, and bundling the second encryption key with the protected software application;
  storing, in a security domain, license information associated with the version of the software application, to protect the license information from discovery, the license information including the license ID, the license key, and a date range that refers to a time period that encompasses the software application release, wherein the security domain includes a first computer having a memory and a processor, the memory containing program instructions, which when executed by the processor, the program instructions are configured to reduce tampering of a software release date associated with a software application; and
  upon invocation of the software application on a second computer, implementing an encryption key exchange between the protected software application and the security domain by:
    passing the license ID and the software release date from the protected software application to the security domain;
    responsive to the security domain containing the license information identified by the license ID, determining whether the software release date passed from the protected software application is within the date range stored in the security domain;
    aborting the encryption key exchange if the license information is not found in the security domain or if the software release date passed from the protected software application is not within the date range stored in the security domain;
    if the software release date passed from the protected software application is within the date range stored in the security domain, using the license key stored in the security domain and the software release date passed to the security domain to generate the first encryption key and the second encryption key;
    encrypting the first encryption key with the second encryption key to create a protected first encryption key, and passing the protected first encryption key to the second computer;
    using the second encryption key bundled with the protected software application to decrypt the protected first encryption key resulting in a decrypted first encryption key; and
    using the first encryption key to decrypt the protected software application for execution, such that attempted modification of the software release date passed to the security domain results in failed decryption of the protected software application.

13. The non-transitory computer-readable medium of claim 12, further comprising: representing the software release date as at least one of: i) a start date and an end date, and ii) a single date and a length of time.

14. The non-transitory computer-readable medium of claim 13, wherein the security domain comprises a software protection platform; and further comprising:
  receiving, by the software protection platform, the date range from the publisher of the software application through an application programming interface (API) to allow the publisher to replace or add the date range, wherein the date range comprises a start date and an end date or a date and a length of time; and
  storing, by the software protection platform, the date range in the security domain to enable the security domain to validate use of the protected software application once the security domain receives the software release date from the protected software application.

15. The non-transitory computer-readable medium of claim 12, wherein the first encryption key comprises a security key and the second encryption key comprises a communication key.

16. The non-transitory computer-readable medium of claim 15, wherein using the license key to generate the security key and the communication key further comprises:

using the license key to generate an unmodified security key and an unmodified communication key for each portion of the software application to be protected;
modifying the unmodified security key with the software release date through a first mathematical operation to generate the security key; and
modifying the unmodified communication key with the software release date through a second mathematical operation to generate the communication key.

17. The non-transitory computer-readable medium of claim 16, further comprising:
calculating the unmodified security key by performing a first nonreversible mathematical operation on the license key; and
calculating the unmodified communication key by performing a second nonreversible mathematical operation on the unmodified security key.

18. The non-transitory computer-readable medium of claim 16, further comprising:
once the security key and the communication key are generated;
encrypting the version of the software application with the security key to create the protected software application;
embedding the communication key within the protected software application and adding license check code to perform a key exchange with the security domain; and
storing the license information, including the license ID, the license key and the date range, in the security domain.

19. The non-transitory computer-readable medium of claim 12, wherein upon invocation of the software application on the second computer, passing a license ID and the software release date from the software application to the security domain, further comprises:
using the license ID, by the security domain, to find a license within the security domain matching the license ID.

20. The non-transitory computer-readable medium of claim 19, wherein using the license key stored in the security domain and the software release date to generate the first encryption key and the second encryption key, further comprises:
using the license key to generate an unmodified security key and an unmodified communication key for each portion of the software application to be protected;
modifying the unmodified security key with the software release date through a first mathematical operation to generate the security key; and
modifying the unmodified communication key with the software release date through a second mathematical operation to generate the communication key.

21. The non-transitory computer-readable medium of claim 19, further comprising:
altering the security key by performing an exclusive-OR operation (XOR) of the security key with a random number received from the software application to obtain an XORed security key;
encrypting the XORed security key with the communication key to create an encrypted XORed security key; and
sending a response containing the encrypted XORed security key back to the software application.

22. The non-transitory computer-readable medium of claim 21, further comprising:
receiving the encrypted XORed security key by the software application, and decrypting the encrypted XORed security key using the communication key embedded in the software application to obtain the XORed security key;
reversing effects of the random number by performing an exclusive-OR operation of the XORed security key with the random number to obtain a copy of the security key; and
using the security key to decrypt protected software code to allow the decrypted software code to execute correctly.

23. A security domain, comprising:
a first computer having a memory and a processor, the memory containing program instructions, which when executed by the processor the program instructions are configured to reduce tampering of a software release date associated with a software application, by:
receiving and storing information associated with the software application to protect the information from discovery, the information including a license ID, a license key, and a date range that refers to a time period that encompasses the software application release, wherein the software program is remotely protected by:
using a license key associated with a license for the software application and the software release date of the software application to generate a first encryption key and a second encryption key, wherein the software release date for the software application is a single date indicating when the software application was released by a software publisher to the public;
embedding a license ID and the software release date in the software application; and
using the first encryption key to encrypt the software application to create a protected software application, and bundling the second encryption key with the protected software application;
upon invocation of the protected software application on a second computer, receiving the license ID and the software release date from the protected software application during the encryption key exchange between the protected software application and the security domain; and
completing, by the security domain, the encryption key exchange by:
responsive to the security domain containing the license information identified by the license ID, determining whether the software release date passed from the protected software application is within the date range stored in the security domain;
aborting the encryption key exchange if the license information is not found in the security domain or if the software release date passed from the protected software application is not within the date range stored in the security domain;
if the software release date passed from the protected software application is if the software release date passed from the protected software application is within the date range stored in the security domain, using the license key stored in the security domain and the software release date passed to the security domain to generate the first encryption key and the second encryption key; and
encrypting the first encryption key with the second encryption key to create a protected first encryption key, and passing the protected first encryption key to the second computer, such that on the second computer the second encryption key bundled with the protected software application is used to decrypt the protected first encryption key resulting in a decrypted first encryption key, and the first encryption key is used to decrypt the protected software application for execution, such that attempted modification of the software release date passed to the security domain results in failed decryption of the protected software application.

\* \* \* \* \*